United States Patent

Hayward

(10) Patent No.: US 6,619,454 B2
(45) Date of Patent: Sep. 16, 2003

(54) THERMAL DISCONNECT DEVICE

(75) Inventor: Dennis Richard Hayward, Dunstable (GB)

(73) Assignee: Goodrich Control Systems Limited, Bedfordshire (GB)

(*) Notice: Subject to any disclaimer, the term of this patent is extended or adjusted under 35 U.S.C. 154(b) by 0 days.

(21) Appl. No.: 10/053,610

(22) Filed: Jan. 24, 2002

(65) Prior Publication Data

US 2002/0104728 A1 Aug. 8, 2002

(30) Foreign Application Priority Data

Jan. 24, 2001 (GB) .............................................. 0101859

(51) Int. Cl.$^7$ ................................................ F16D 9/02
(52) U.S. Cl. ..................... 192/40; 192/56.4; 192/56.51; 192/71; 192/82 T; 192/84.8; 464/31
(58) Field of Search ......................... 192/40, 56.4, 71, 192/84.8, 82 T, 150, 56.51, 56.5; 464/31; 403/325

(56) References Cited

U.S. PATENT DOCUMENTS

| | | | | |
|---|---|---|---|---|
| 2,493,232 A | * | 1/1950 | Dodge | 192/56.5 |
| 3,889,789 A | * | 6/1975 | Boehringer | 192/82 T |
| 4,042,088 A | | 8/1977 | Schmohe | 192/114 R |
| 4,086,991 A | * | 5/1978 | Swadley | 192/82 T |
| 4,244,456 A | | 1/1981 | Loker | 192/27 |
| 4,271,947 A | * | 6/1981 | Gaeckle | 192/82 T |
| 4,349,092 A | * | 9/1982 | Geisthoff | 192/69.9 |
| 4,379,502 A | * | 4/1983 | Ball et al. | 192/71 |
| 4,537,578 A | * | 8/1985 | Sharpe et al. | 464/31 |
| 4,685,550 A | | 8/1987 | Metcalf | 192/69.8 |
| 4,694,944 A | * | 9/1987 | Schmidt | 192/56.5 |
| 4,932,280 A | * | 6/1990 | Becker et al. | 464/32 |
| 4,934,977 A | * | 6/1990 | Falconer et al. | 464/31 |
| 4,989,707 A | | 2/1991 | Doty et al. | 192/69.2 |
| 5,085,306 A | * | 2/1992 | Beigang | 192/71 |
| 5,103,949 A | | 4/1992 | Vanderzyden et al. | 192/24 |
| 5,156,247 A | * | 10/1992 | Wiese et al. | 192/71 |
| 6,364,772 B1 | * | 4/2002 | Sugden | 464/31 |

FOREIGN PATENT DOCUMENTS

| | | |
|---|---|---|
| DE | 33 30 287 A1 | 3/1984 |
| EP | 1 170 522 A1 * | 1/2002 |
| FR | 1061450 | 4/1954 |

OTHER PUBLICATIONS

Patent Abstracts of Japan, vol. 18, No. 325, Jun. 21, 1994, Publication No. 06074250, published Mar. 15, 1994.
Patent Abstracts of Japan, vol. 18, No. 325, Jun. 21, 1994, Publication No. 06074250, published Mar. 15, 1994.

* cited by examiner

Primary Examiner—Rodney H. Bonck
(74) Attorney, Agent, or Firm—Mintz Levin Cohn Ferris Glovsky and Popeo PC

(57) ABSTRACT

A disconnect device is provided in which input and output elements 2 and 4 axially overlap and are drivingly interconnected by balls 14 which extend from a recess the radially innermost element into a channel in the radially outermost element. The balls are held in position by a keeper 16 which is axially movable to release the balls and disconnect the drive.

23 Claims, 2 Drawing Sheets

THERMAL DISCONNECT DEVICE

FIELD OF THE INVENTION

The present invention relates to a disconnect device for removing the driving connection between two rotating elements.

BACKGROUND TO THE INVENTION

It is known to provide disconnect devices between a prime mover and a load driven from a prime mover. Such disconnect devices are often found in aircraft generator systems where an aircraft generator is driven from a spool of a gas turbine engine. It is highly desirable that, in the event of a generator malfunction or upon detection of conditions which are indicative of an impending generator malfunction, that the generator load can be disconnected from the prime mover thereby ensuring that the operation of the prime mover is unpeturbed by the fault in the generator.

U.S. Pat. No. 5,103,949 discloses a disconnection device in which a drive shaft carries a threaded portion and a plunger is arranged to move in from the side of the drive shaft to engage the threaded portion, thereby causing the screwing action between the plunger and the threaded portion to displace the shaft axially such that it becomes disconnected from a prime mover.

U.S. Pat. No. 4,042,088 similarly has a drive shaft which engages a prime mover via a castellated connection region. The drive shaft also carries a helically threaded portion and a disconnect plunger is arranged to move in from the side of the drive shaft to engage the threaded portion to cause the shaft to move axially so as to disconnect the shaft from the prime mover.

U.S. Pat. No. 4,989,707 discloses a similar arrangement in which a element moves in from the side of a drive interface between input and output shafts in order to engage a threaded portion of a ring in order to cause disconnection between the shafts.

Each of these prior art arrangements suffers from the problem that the shafts will, in general, be rotating rapidly and that the teeth on the control element which moves radially inward to engage the screw thread must engage the thread rapidly before they become damaged or sheared off.

U.S. Pat. No. 4,086,991 discloses a disconnect coupling in which helical splines are used to connect a coupling shaft to a driven member so as to transmit torque to the driven member. The helical splines are carried on an axially movable shaft and are arranged such that the transmission of torque to the driven member acts to urge the coupling shaft and driven member to move to a disengaged position. In normal use, this movement to a disengaged position is inhibited by the provision of a fusible element, such as a eutectic pellet. Such pellets are generally of a soft material and the crushing of the pellet under a compressive load is a well recognised problem, see for example, U.S. Pat. No. 4,271,947 wherein the pellet is manufactured with wire strands therein in order to give it additional mechanical strength. Because of the use of helical splines in U.S. Pat. No. 4,086,991 the crushing force acting on the eutectic pellet varies as a function of the torque transmitted through the disconnect coupling. In particular, the pellet must be able to withstand the crushing load at full torque transfer without suffering deformation. This increase in material in the pellet means that the pellet has an increased mass and thermal capacity, and as such the rate at which the pellet warms is reduced, thereby leading to a potential slowing of the decoupling mechanism. Another problem with the system described in U.S. Pat. No. 4,086,991 is that decoupling between the shaft and the load may not occur when the shaft is lightly loaded. This is significant since the load may be a generator and it is conceivable that the generator itself may not fail, but that the cooling system for the generator might fail, thereby resulting in the need to disconnect the generator in order to prevent damage to it even when the generator is lightly loaded.

U.S. Pat. No. 4,271,947 discloses an arrangement in which two axially aligned shafts engage each other via coaxial gears having teeth extending in the axial direction. A compression spring extends between the gears and urges an axially displaceable one of the gears to move away from the axially fixed gear. A fusible element having strengthening filaments therein acts to resist both the force of the compression spring and the axial forces resulting from torque transfer via the inclined surfaces of the gear teeth.

U.S. Pat. No. 4,685,550 discloses a disconnect device in which opposing rings of teeth can move apart axially to disconnect a motor from an output shaft. This connection motion is inhibited by a ball detent mechanism. A solenoid can be operated in order to open an escape route for the ball such that it falls radially inwards into a central shaft. This then allows the rows of teeth (which form part of a tapered jaw clutch) to disconnect.

SUMMARY OF THE INVENTION

According to the present invention, there is provided a selectively disconnectable drive coupling comprising a first element, a second element, a plurality of coupling elements and a release mechanism, wherein the first and second elements are coaxially aligned with a portion of the first element extending within a channel formed in the second element, and the coupling elements are moveable between a drive position where they extend between seats in the first element and corresponding passages in the second element such that the first and the second elements are drivingly connected, and a disconnected position in which the plurality of coupling elements have moved out of the passages in the second element so as to drivingly disconnect the first and second elements, and wherein the release mechanism retains the coupling elements at the drive position until such time as the release mechanism is activated.

It is thus possible to provide a quick release disconnect mechanism in which the coupling elements move towards the disconnected position under a combination of the forces acting between the coupling elements and the first element and also centrifugal force due to the rotary motion of the first and second elements.

Preferably the first element is an input shaft and the second element is an output shaft or other device driven by the input shaft.

Advantageously the coupling elements have curved or inclined surfaces that engage with co-operating surfaces in the seats on the first element such that the transmission of torque between the first element and the second element acts to urge the coupling elements in the disconnected direction.

Preferably the release mechanism comprises a keeper element which blocks the motion of the coupling elements from the drive position to the disconnect position until such time as a release instruction is received.

Preferably the blocking action of the keeper element is removed in a response to an electrical signal.

Advantageously the keeper element is axially slideable along an exterior surface of the second element. The keeper element can thus be removed from the position at which it blocks the motion of the coupling elements from the drive position to the disconnect position.

Preferably the keeper element includes at least one capture region, for example at least one cavity or channel therein, in order to capture the coupling elements after they have moved to the disconnect position. Advantageously, after the keeper has entrained the coupling elements within its at least one cavity or channel, the keeper moves to a further position whereby the coupling elements are prevented from re-entering the passages in the second element, thereby ensuring that drive cannot be inadvertently restored.

Preferably the keeper element is spring biased from the drive position to a decoupled position.

Advantageously the keeper is held against the urging of the spring bias by a release element. Advantageously the release element is responsive to the presence of an external signal to release the keeper element such that it becomes free to move from the blocking position.

Advantageously the release element is responsive to the presence of a magnetic field.

Preferably the release element is a fusible element which becomes melted as a result of eddy current heating occurring as a result of the presence of the magnetic field. In a preferred embodiment, the release element is a ring of metal having a relatively low melting point, such as solder or a eutectic mix, such that eddy current heating occurring as a result of the rotary motion of the release element with respect to the magnetic field causes the release element to melt thereby allowing the keeper element to move under the urging of its spring.

Advantageously the release element is contained within a capture element, for example in the form of a cylindrical shell or a cup. This constrains the melted material of the release element from being thrown outwards under centrifugal force and also provides an additional source of heating. Advantageously the keeper element extends within the cylindrical or cup shaped element, even when the keeper element is at the drive position. Advantageously the opposing end of the cup or cylinder opens into a capture region where the melted material of the release element becomes retained. Thus, as the release element melts, the melted material moves into the capture area, either as a result of the flow of the material under centrifugal force or as a result of being squeezed because of the motion of the keeper element.

Advantageously one of the first and second elements includes a weakened section such that this section sheers at a predetermined torque in order to form a further point of disconnect in the event that a sudden seizure results in unexpectedly high drive forces occurring.

BRIEF DESCRIPTION OF THE DRAWINGS

The present invention will further be described, by the way of example, with reference to the accompanying drawings, in which.

DETAILED DESCRIPTION OF THE INVENTION

Figure 1:
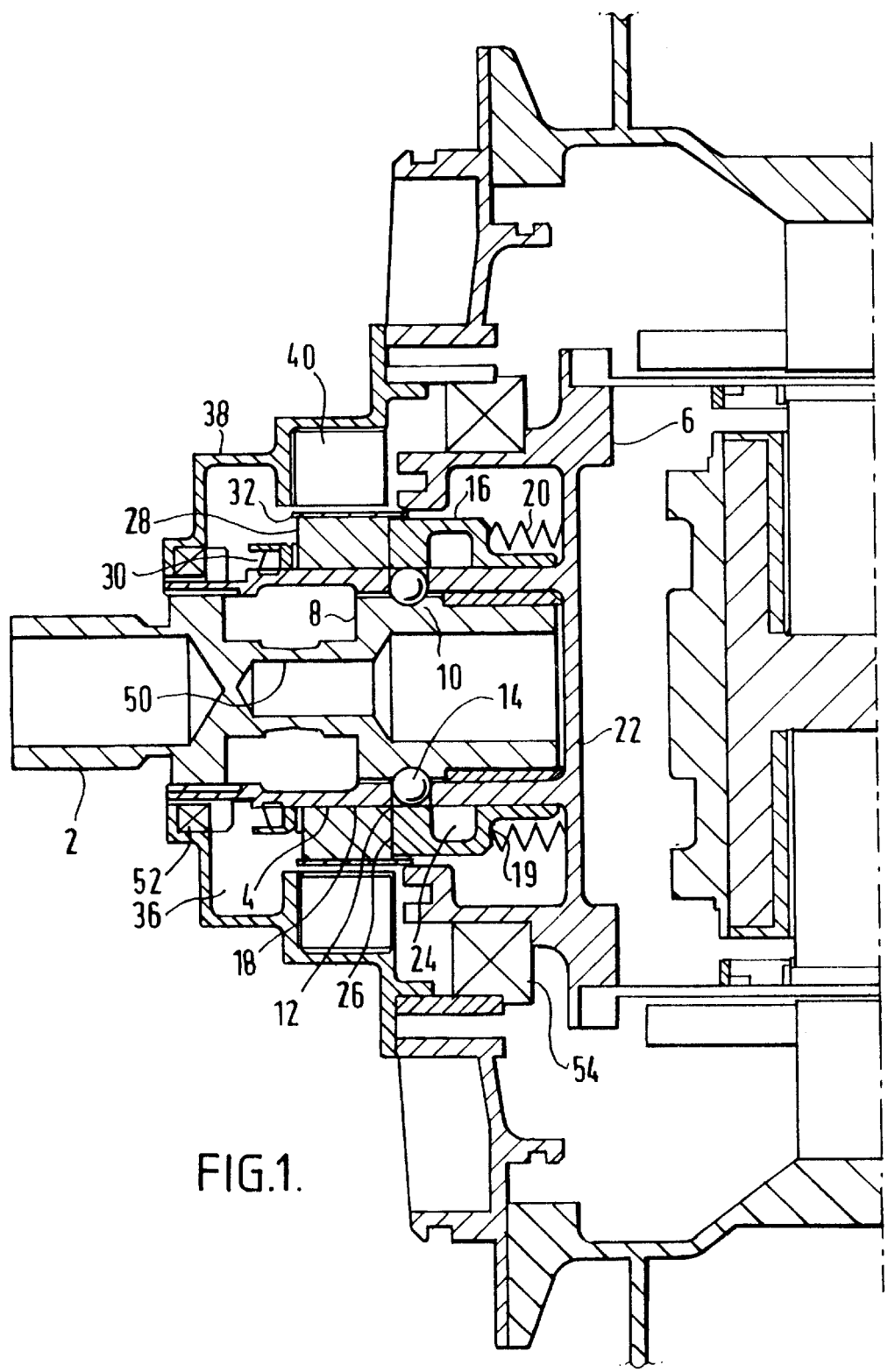
FIG. 1 is a cross section through a disconnect device constituting an embodiment of the present invention.

FIG. 1 schematically illustrates a cross section through a disconnect device constituting an embodiment of the present invention. The device comprises a shaft 2 which extends within a cylindrical sleeve 4 formed as part of an element 6. The element 6 may itself be a shaft or may be a rotating plate, a gear, a flange or some other component. The shaft 2 has a portion 8 whose diameter is just slightly smaller than the internal diameter of the cylindrical sleeve 4. Portion 8 defines a plurality of seats 10. In use, the seats 10 align with passages 12 formed in the cylindrical sleeve 4. Coupling elements 14 extend between the shaft 2 and the cylindrical sleeve 4 in order to transmit a torque from the shaft 2 to the cylindrical sleeve 4. The coupling elements 14 are in the form of spheres. Part of the surface of each sphere engages with the co-operating seat 10 formed in the region 8 of the shaft 2 whereas another part of the surface of the sphere engages with the cylindrical wall of the passages 12 formed in the cylindrical sleeve 4.

In use, the transmission of torque between the shaft 2 and the element 6 via the spheres 14 would tend to cause the spheres to ride up on the inclined or part cylindrical surfaces of the seats 10 and move into the passageway 12. This would cause the shaft 2 to become drivingly disconnected from the element 6. In order to inhibit this motion, a keeper 16 is provided adjacent to the passageways 12 in order to retain the spheres 14 therein. The keeper 16 is axially slideable along a portion of an outer surface 18 of the cylindrical sleeve 4 of the element 6. The keeper 16 comprises a block of material defining a first face 19. A compression spring 20 extends between the first face 19 and an end wall 22 of the element 6. The compression spring 20 urges the keeper element 16 to move away from the end wall 22. The keeper element includes an annular passage 24 therein. The annular passage 24 opens radially inwardly and is dimensioned so as to be big enough to accept the entirety of the spheres 14 therein.

Figure 2:
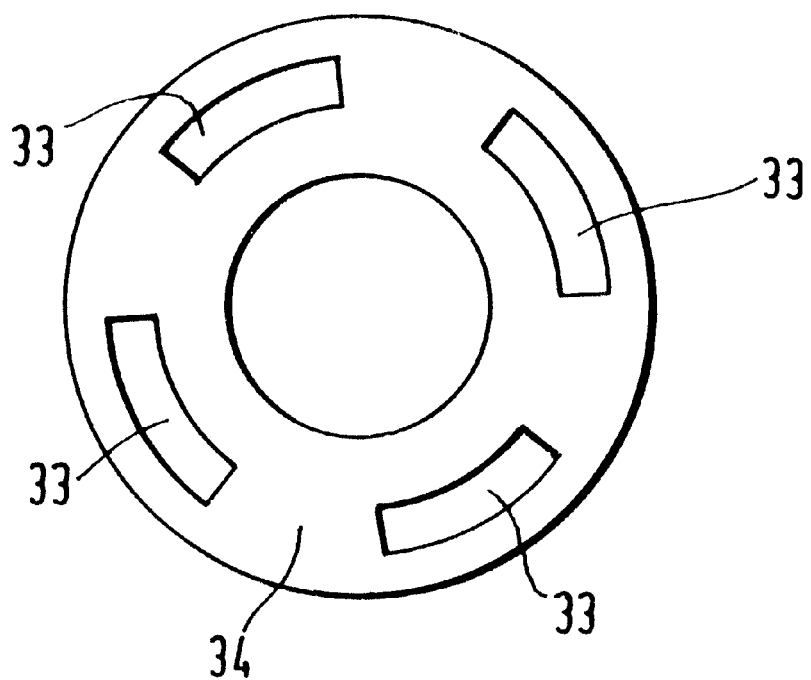
FIG. 2 is an end view of the cup shaped element retaining the release element.

A second face 26 of the keeper abuts a release element 28. The action of the compression spring 20 is to cause the keeper element 16 to press against the release element 28 and to urge it to move away from the end wall 22. The release element 28 is held in position on the cylindrical sleeve 4 by a lock nut 30. The release element 28 is held within a cup shaped element 32 made of a material with a relatively high melting point, such as stainless steel. The cup shaped element 32 has a plurality of holes 33 in the end portion 34 thereof, as shown in FIG. 2, which face into a capture region 36. The capture region 36 is defined by an exterior wall 38 the function of the capture region will be described hereinafter. The wall 38 serves to define a support for a magnetic coil 40 which is disposed adjacent and which encircles the release element 32.

In normal use, the disconnect device is in the configuration shown in FIG. 1. Thus, the spheres 14 engage with both the seats 10 formed in the shaft 2 and the walls of the passages 12 formed in the cylindrical portion 4 of the element 6. The balls 14 are retained in this driving position by the keeper 16. The disconnect arrangement may be associated with an item of equipment, such as a aeronautical generator. The disconnect arrangement and the generator may be housed within a single enclosure thereby forming a single unit. Sensors provided in the enclosure monitor the operation of the generator, the temperature of lubricant used within the unit and they also monitor the condition of bearings and the like. A data processor monitors the output of the sensors in order to continually check the state of health of the generator and the other components. If the data processor detects that a fault condition has occurred, or that component failure is occurring which will lead to a fault condition, the data processor may seek to disconnect the mechanical drive to the generator. In order to do this, the data processor energises the coil 40. Lines of magnetic flux from the coil 40 cut through the body of the release element 28 and also through the cup shaped element 32. The coil 40 is held on a stator plate, whereas the release element 28 rotates with the output element 6. Thus the release element continually cuts through the lines of flux generated by the coil 40 and consequently the release element 28 and the material of the steel cup 32 undergo eddy current heating. The release element 28 is made of a eutectic material or a solder and consequently has a well defined and relatively low melting point. The eddy current heating warms the release element 28 up to and above its melting point causing the material thereof to soften. As the release element 28 softens, it no longer has sufficient strength to resist the compressive force generated by the spring 20 and as a result the keeper element 16 begins to move under the action of the spring 20 away from the end wall 22. As the keeper element 16 moves, the material of the release element 28 flows through the passages 33 in the end wall 34 of the cup shaped element 32 and into the containment region 36 where the eutectic mixture cools and re-solidifies. As the keeper moves away from the end wall 22 the annular recess 24 moves into alignment with the passageways 12. As it does so, the spheres 14 become free to move radially outwardly under the combined urging of the forces acting between the sphere 14 and its associated seat 10 and also centrifugal force (in aeronautical applications the shaft may rotate at 20,000 or more revolutions per minute and consequently the centrifugal forces are significant). Thus spheres 14 move into annular cavity 24 thereby disconnecting the shaft 2 from the element 6. As the release element 28 continues to melt, the keeper element 16 continues to move away from the end wall 22. This motion causes the spheres to be moved out of alignment with the passages 12 thereby preventing the spheres from dropping back into the passages 12. Thus inadvertent reconnection between the shaft 2 and the element 6 is avoided.

As shown in FIG. 1, the keeper element 16 extends partially within the cup shaped element 32, even when the keeper element is at the driving position. This ensures that the keeper element 16 cannot snag or become trapped on the end surface of the cup shaped element 32.

The shaft 2 acts as an input to the generator (or some other rotating machine) and has a neck region 50 which forms a weak point therein such that this will preferentially fail at a predetermined torque in the event of a sudden seizure occurring within the generator. The shaft 2 is supported on bearings (as shown) and the element 6 is supported by bearings 52 and 54. The element 6 may form part of the generator.

The exterior surface of the cup shaped portion 4 against which the lock nut 30 bears advantageously includes a stop formed thereon in order to prevent the lock nut from being wound too tightly, possibly resulting in the crushing of the release element 28. The disconnect arrangement is held within or supported on a fixed housing which serves to provide support surfaces for the bearings and which serves to protect the disconnect mechanism against ingress of foreign material.

It is thus possible to provide an electrically operated disconnect mechanism which provides for quick and irreversible disconnection between an input shaft 2 and an element 6. The use of a fusible release element has the further advantage that the release mechanism can self-disconnect in the event of a excessive heat surrounding the release mechanism thereby giving a second disconnect mode which is operable even in the event of failure of the electrical disconnect system. Such heat may be conveyed to the disconnect mechanism via conduction through the input or output shafts, or via heating of the liquid cooling and lubricating fluid that surrounds and/or is sprayed over the disconnect mechanism. The heat is expected to be the result of friction or hydrodynamic churning in the gearbox as a result of a failure within the gearbox. Thus, even in the event non-operation of the electrically operated release mechanism, the disconnect mechanism will still operate when the temperature around it becomes sufficient to melt the fusible release element.

What is claimed is:

1. A selectively disconnectable drive coupling comprising a first element, a second element, a plurality of coupling elements and a release mechanism, wherein the first and second elements are coaxially aligned with a portion of the first element extending within the second element, and the coupling elements are movable between a drive position here they extend between seats in the first element and corresponding passages in the second element such that the first and second elements are drivingly connected, and a disconnected position in which the plurality of coupling elements have moved out of the passages in the second element so as to drivingly disconnect the first and second elements, and wherein the release mechanism retains the coupling elements at the drive position until such time as the release mechanism is activated, the release mechanism comprises a fusible release element and a magnetic field generator for generating a magnetic field which causes the fusible element to melt by virtue of eddy current heating.

2. A selectively disconnectable drive as claimed in claim 1, in which the coupling elements are urged towards the disconnected position by a combination of the forces acting between the coupling elements and the first element, and centrifugal force due to rotary motion of the first and second elements.

3. A selectively disconnectable drive coupling as claimed in claim 1, in which the first element is an input haft and the second element is an output shaft or device driven by the input shaft.

4. A selectively disconnectable drive coupling as claimed in claim 1, in which the coupling elements have curved or inclined surfaces that engage with co-operating surfaces in the seats of the first element such that the transmission of toque between the first element and the second element acts to urge the coupling elements towards the disconnected position.

5. A selectively disconnectable drive as claimed in claim 1, in which the release mechanism comprises a keeper element which blocks the motion of the coupling elements from the drive position to the disconnected position and in which the keeper element includes at least one capture region in order to capture the coupling elements after they have moved to the disconnect position.

6. A selectively disconnectable drive coupling as claimed in claim 5, in which the blocking action of the keeper element is removed in response to an electrical signal.

7. A selectively disconnectable drive coupling as claimed in claim 5, in which the keeper element is axially slideable with respect to the second element from a position where it retains the coupling elements at the drive position to a second position where the coupling elements can move to the disconnected position.

8. A selectively disconnectable drive as claimed in claim 5, in which, after the coupling elements have been captured within the capture region, the keeper elements move to a position whereby the coupling elements are prevented from re-entering the passages in the second element.

9. A selectively disconnectable drive device as claimed in claim 1, in which the release element is contained within a capture element and which captures the melted material of the release element.

10. A selectively disconnectable drive device as claimed in claim 1, in which one of the first and second elements includes a weakened section such that it shears at a predetermined torque.

11. A selectively disconnectable drive device as claimed in claim 1, characterised in that the mechanism is responsive to temperatures above a predetermined threshold to release the coupling elements.

12. A selectively disconnectable drive coupling comprising a first element, a second element, a plurality of coupling elements and a release mechanism, wherein the first and second elements are coaxially aligned with a portion of the first element extending within a channel formed in the second element, and the coupling elements are movable between a drive position here they extend between seats in the first element and corresponding passages in the second element such that the first and second elements are drivingly connected, and a disconnected position in which the plurality of coupling elements have moved out of the passages in the second element so as to drivingly disconnect the first and second elements, and wherein the release mechanism retains the coupling elements at the drive position until such time as the release mechanism is activated, the release mechanism comprises a keeper element which blocks the motion of the coupling elements from the drive position to the disconnected position until such time as a release instruction is receive, the keeper element is spring biased from a position where it retains the coupling elements at the drive position and the keeper element is held against the urging of the spring by a release element.

13. A selectively disconnectable drive coupling comprising a first element, a second element, a plurality of coupling elements and a release mechanism, wherein the first and second elements are coaxially aligned with a portion of the first element extending within a channel formed in the second element, and the coupling elements are movable between a drive position where they extend between seats in the first element and corresponding passages in the second element such that the first and second elements are drivingly connected, and a disconnected position in which the plurality of coupling elements have moved out of the passages in the second element so to drivingly disconnect the first and second elements, and wherein the release mechanism returns the coupling elements at the drive position until such time as the release mechanism is activated and in which the release mechanism includes a keeper element having at least one capture region in order to capture the coupling elements after they have moved to the disconnected position, the keeper element is axially slideable with respect to the second element from a first position where it retains the coupling elements at the drive position to a second position where the coupling elements can move to the disconnected position, and after the coupling elements hay been captured within the capture region, the keeper element moves to a position whereby the coupling elements are prevented from reentering the passages in the second element.

14. A selectively disconnectable drive as claimed in claim 13, in which the coupling elements are urged toward the disconnected position by a combination of the forces acting between the coupling element and the first element, and centrifugal force due to rotary motion of the first and second elements.

15. A selectively disconnectable drive coupling as claimed in claim 13, in which the first element is an input shaft and the second element is an output shaft or device driven by the input shaft.

16. A selectively disconnectable drive coupling as claimed in claim 13, in which the coupling elements have curved or inclined surfaces that engage with co-operating surfaces in the seats of the first element such that the transmission of torque between the first element and the second element acts to urge the coupling elements towards the disconnected position.

17. A selectively disconnectable drive coupling as claimed in claim 13, in which the blocking action of the keeper element is removed in response to an electrical signal.

18. A selectively disconnectable drive device as claimed in claim which the keeper element is spin biased from a position where it retains the coupling elements at the drive position and the keeper element is held against the urging of the spring by a release element.

19. A selectively disconnectable drive device as claimed in claim 13, in which the release element is released in the presence of a magnetic field.

20. A selectively disconnectable drive device as claimed in claim 19, in which the release element is a fusible element which becomes melted as a result of eddy current heating.

21. A selectively disconnectable drive device as claimed in claim 20, in which the release element is contained within a capture element and which captures the melted material of the release element.

22. A selectively disconnectable drive device as claimed in claim 13, in which one of the first and second elements includes a weakened section such that it shears at a predetermined torque.

23. A selectively disconnectable drive device as claimed in claim 13, characterised in that the release mechanism is responsive to temperatures above a predetermined threshold to release the coupling elements.

* * * * *